Patented July 3, 1934

1,965,429

UNITED STATES PATENT OFFICE 1,965,429

CRYSTALLINE ANHYDROUS CITRIC ACID AND METHOD OF MAKING SAME

Richard Pasternack, Brooklyn, N. Y., Francis L. Mead, Jersey City, N. J., and John L. Davenport, Brooklyn, N. Y., assignors to Charles Pfizer & Company, Brooklyn, N. Y., a corporation of New Jersey No Drawing. Application January 7, 1931, Serial No. 507,300

16 Claims. (Cl. 260—122)

Pasternack and Brehmer, S. N. 395,462, filed September 26, 1929, U. S. P. 1,792,657, have disclosed a process of producing anhydrous citric acid and the resulting product by treating hydrated citric acid in shallow layers with dry heated air between 35° C. and 50° C. until the anhydrous acid becomes granular and free flowing. This results in a product comprising opaque white granules, each granule being an agglomeration of microscopically small crystals of anhydrous citric acid, but free flowing and especially useful for tablet machines, and for other purposes. The granules produced are somewhat porous and retain substantially the same characteristics as the granulated hydrated citric acid originally employed.

In experimentation for the purpose of improving the above process and product we have discovered that by employing conditions different from and undisclosed in the above patent, both an improved process and an improved product result. While both products are 99% or more pure anhydrous citric acid, they differ materially in appearance and physical character. Whereas, the product of the former process results in opaque, white granules generally related to the screen characteristics of the hydrated materials originally used, our product may be produced from an ordinary granulator, and has no relation to the screen characteristics of the starting material, and also, instead of being of relatively porous white opaque granules, is of translucent crystalline dense structure and not having a whiteness due to the opacity and porosity of the granules. For this reason, the grain resulting from the present process is preferable to that of the prior process in some commercial work. Each grain consists of individual transparent crystals resembling granulated sugar and is considerably less porous than that made by the prior process. The individual macro crystals belong to the mono-clinic prismatic system, having a specific gravity of substantially 1.66 at 24° C.

We have discovered that anhydrous citric acid is best produced from saturated or oversaturated solutions of citric acid under controlled temperatures maintained between specified limits. It has been found that unsatisfactory results are produced when a solution of citric acid is boiled down under atmospheric pressure to the crystallization point, both because of too high a temperature and also difficulty in dealing with the mother liquors. For example, at above 130° C. there is serious loss by decomposition and discoloration of the product.

Our study of the formation of anhydrous citric acid in aqueous solution has shown that anhydrous acid economically forms at a temperature above 41° C. and below 100° C. without decomposition and discoloration. Conditions favorable to this formation are obtained by increasing the ratio of citric acid to water, for example by adding hydrated acid to a saturated solution, thereby poducing momentarily a supersaturated solution, or by treating a solution of acid in such a way that it becomes in effect supersaturated, and then causing the anhydrous acid to crystallize out.

The following procedures describe the conditions required for the crystallization of anhydrous citric acid from its aqueous solutions according to our invention:

I. A saturated solution of hydrated citric acid is prepared. Saturation temperature is to be selected between 41° and 100° C. We prefer to work at 55° C. To this saturated solution is now added solid hydrated citric acid, applying sufficient heat to maintain the original temperature and momentarily dissolve the hydrated citric acid added. All hydrated citric acid over and above the amount necessary for saturation will be converted to anhydrous citric acid, remaining as such in suspension in the liquor.

The anhydrous acid can then be separated by filtering or centrifuging, washing free from mother liquor with a small quantity of water or saturated citric acid solution, and drying to eliminate extraneous moisture. The free flowing shiny product thus obtained will test not less than 99.0% anhydrous citric acid.

II. A solution of citric acid is boiled under an absolute pressure of 1½" of mercury, and not less than 1¼" to a concentration of about 42° Bé. (gravity taken at 65.6° C.). The vacuum is then broken and the solution heated to 75 to 80° C. to prevent sudden crystallization. This solution is then transferred to a crystallization pan or a jacketed vessel with agitator, (so called granulator) and cooled to a temperature not lower than 41° C. Crystallization of anhydrous citric acid takes place, which may be separated as described in Example I, and is similar to the product of Example I. Further crops of anhydrous acid may be obtained from the mother liquor by repeating the vacuum evaporation and crystallization.

III. A solution of citric acid is evaporated under an absolute pressure of 1½" of mercury, and not less than 1¼". When the evaporation is continued beyond the saturation point, separation of crystals of anhydrous citric acid begins. Evaporation is continued until a satisfactory crop of crystals similar to Examples I and II is obtained. The separation from the mother liquor is effected in the usual manner by centrifugation. If the solution of citric acid is boiled under an absolute pressure less than 1¼" of mercury and continued beyond saturation, then a crystallization of hydrated citric acid is obtained.

The relation between vacuum, boiling point, and form of citric acid obtained is shown in the following table:—

| Form of citric acid obtained | Absolute pressure | Boiling point |
|---|---|---|
| Anhydrous acid (99% or better) | 2½" | 52° |
| Anhydrous acid (99% or better) | 1¾" | 45° |
| Anhydrous acid (98.4%) | 1¼" | 40.6° |
| Hydrated acid (99.7%) | 1" | 37° |

As will be seen from the examples given above, there are three distinct methods by which anhydrous citric acid can be prepared.

I. Direct conversion of hydrated acid to anhydrous acid by treating solid hydrated citric acid with a saturated citric acid solution maintained at a temperature above 41° C.

II. Crystallization of a citric acid solution concentrated in a vacuum to 42° Bé., holding the crystallization temperature above 41° C.

III. Crystallization by continued evaporation under vacuum, the absolute pressure being not less than 1¼" of mercury. At an absolute pressure of 1" of mercury, hydrated acid is the sole crystallization product.

By our invention a simpler, quicker and cheaper process is provided, which gives a free flowing translucent crystalline product resembling granulated sugar very suitable for various commercial uses.

The grains are relatively resistant to abrasion and powdering in handling and shipping. While we have given preferred conditions of temperature, pressure and gravity, we do not restrict ourselves strictly thereto except as required by the appended claims.

The invention claimed is:

1. Process of dehydrating citric acid consisting in adding hydrated citric acid to an aqueous saturated solution of citric acid at a temperature between 41° C. and 100° C.

2. Process of obtaining anhydrous citric acid comprising cooling to above 41° C. an aqueous solution of citric acid concentrated under an absolute pressure of about 1½" of mercury at below 100° C.

3. Process of obtaining anhydrous citric acid comprising cooling to above 41° C. an aqueous solution of citric acid concentrated under reduced pressure at below 100° C.

4. Process of obtaining anhydrous citric acid comprising cooling to above 41° C. an aqueous solution of citric acid concentrated under an absolute pressure of not less than 1¼" of mercury at below 100° C.

5. Process of obtaining anhydrous citric acid comprising cooling to above 41° C. an aqueous solution of citric acid concentrated under reduced pressure to about 42° Bé. at below 100° C.

6. Process of obtaining anhydrous citric acid comprising cooling to above 41° C. an aqueous solution of citric acid concentrated under reduced pressure at between 45° C. and 65° C.

7. Process of dehydrating citric acid comprising concentrating an aqueous citric acid solution under reduced pressure at a temperature below 100° C., raising the pressure and heating the solution to not over 100° C., cooling to not lower than 41° C. and agitating to separate the anhydrous acid.

8. Process of obtaining anhydrous citric acid, comprising evaporating an aqueous solution of citric acid under reduced pressure at a boiling temperature between 41° and 100° C., continuing said evaporating until a separation of a satisfactory crop of anhydrous citric acid is obtained, and removing the mother liquor by centrifugation.

9. Process of recovering anhydrous citric acid from an aqueous solution of citric acid comprising treating said solution to produce momentary oversaturation, and effecting crystallization of the excess acid as anhydrous citric acid under an absolute pressure of not less than 1¼" of mercury and a temperature between 41° and 100° C.

10. Process of crystallizing anhydrous citric acid comprising evaporating an aqueous citric acid solution under reduced pressure at a temperature above 41° C. and not greater than 100° C.

11. Process of crystallizing anhydrous citric acid comprising evaporating an aqueous citric acid solution under an absolute pressure of not less than 1¼" of mercury at a temperature above 41° C. and not greater than 100° C.

12. Process of crystallizing anhydrous citric acid comprising concentrating an aqueous citric acid solution under an absolute pressure of not less than 1¼" of mercury at a temperature above 41° C. and not greater than 100° C. to obtain a crystalline product from oversaturated solution.

13. Process of obtaining anhydrous citric acid from aqueous solution comprising forming an aqueous citric acid solution, and effecting over saturation at between 41° C. and 100° C. to crystallize out as anhydrous citric acid the excess acid in solution over saturation.

14. Substantially anhydrous citric acid in translucent crystalline substantially non-porous grains, resembling in appearance granulated sugar and substantially free from decomposition products.

15. Substantially anhydrous citric acid in the form of translucent, substantially non-porous grains, substantially free from powdered material and resistant to mechanical abrasion, resembling in appearance granulated sugar, of relatively high apparent density, each grain consisting of individual transparent crystals having a specific gravity of substantially 1.66 at 24° C., the grains being relatively mechanically resistant and substantially free from decomposition products.

16. Anhydrous citric acid resembling in appearance granulated sugar, each grain consisting of individual transparent crystals, having a specific gravity of substantially 1.66 at 24° C. and substantially free from mother liquor and decomposition products.

RICHARD PASTERNACK.
FRANCIS L. MEAD.
JOHN L. DAVENPORT.